US 6,750,278 B2
Jun. 15, 2004

(12) United States Patent
Patil et al.

(54) POLYVINYL CHLORIDE RESINS

(75) Inventors: Abhimanyu O. Patil, Westfield, NJ (US); Donald N. Schulz, Annandale, NJ (US); Manika Varma-Nair, Warren, NJ (US); David J. Lohse, Bridgewater, NJ (US); Christine A. Costello, Easton, PA (US); Richard H. Schlosberg, Bridgewater, NJ (US); Michael G. Matturro, Lambertville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 91 days.

(21) Appl. No.: 10/238,172

(22) Filed: Sep. 10, 2002

(65) Prior Publication Data

US 2003/0092842 A1 May 15, 2003

Related U.S. Application Data

(63) Continuation-in-part of application No. 09/618,186, filed on Jul. 18, 2000, now abandoned.

(51) Int. Cl.⁷ .......................... C08L 27/06; C08L 73/00; C08K 5/12
(52) U.S. Cl. .................... 524/296; 524/287; 524/297; 524/298; 524/314; 524/357; 524/425; 524/445; 525/185; 525/190
(58) Field of Search .................... 524/287, 296, 524/297, 298, 314, 357, 425, 445; 525/185, 190

(56) References Cited

U.S. PATENT DOCUMENTS 3,780,140 A    12/1973  Hammer ................... 260/884

FOREIGN PATENT DOCUMENTS

| WO | WO9013600 | 11/1990 |
|----|-----------|---------|
| WO | WO9207029 | 4/1992  |
| WO | WO0043437 | 7/2000  |

OTHER PUBLICATIONS

Database WPI, Section Ch, Week 199210, Derwent Publications Ltd., London, GB, AN 1992–077264, XP002220064 & JP 04 023854 A (Mitsui Dupont Poly), Jan. 28, 1992 abstract.

*Primary Examiner*—David J. Buttner
(74) *Attorney, Agent, or Firm*—Joseph C. Wang

(57) ABSTRACT

The invention is directed towards a PVC resin composition comprising polyvinyl chloride and a plasticizer selected from the group consisting of: i) a non-linear, paraffin-soluble olefin-CO copolymer; ii) an olefin-CO-X terpolymer derived from non-pure feeds; iii) a non-linear olefin-CO copolymer derived from non-pure feeds; and iv) a non-linear CO-X copolymer; wherein X is selected from the group consisting of alpha-olefin, vinyl acetate, neo vinyl ester and mixtures thereof. The invention also provides a method for a preparing the PVC resin composition as well as a product formed using the PVC resin.

24 Claims, No Drawings

POLYVINYL CHLORIDE RESINS

This application is a Continuation-in-Part of U.S. Ser. No. 09/618,186 filed Jul. 18, 2000 now abandoned.

FIELD OF THE INVENTION

The invention is directed towards novel carbon monoxide containing compositions effective as plasticizers for polyvinyl chloride resins.

BACKGROUND

Polyvinyl chloride (PVC) is a versatile polymer which is used in many applications such as water piping, floor tile, exterior vinyl siding, electrical wire insulation, shower curtains and synthetic leather. Plasticizers are added to PVC to improve flow, and therefore processability, as well as to reduce the brittleness of the product. A plasticizer is a material incorporated in a plastic to increase its workability and its flexibility or distensibility (i.e., elongation). This is achieved by lowering the glass transition temperature ("$T_g$"), thereby producing a change in properties from those of a hard, brittle, glasslike solid to those of a soft, flexible, tough material. The vast majority of plasticizers used today are monomeric ester-types. Phthalates such as diisononyl phthalate, diisodecyl phthalate and di(2-ethylhexyl) phthalate (dioctyl phthalate, DOP) are well known and commonly used plasticizers. Further, plasticizers are usually added to PVC on hot rolls or in a hot mixer such as a Banbury. The plasticizer content varies widely depending on the end use of the material; however, typically plasticizer content will be approximately 5 to approximately 50% by weight.

When evaluating which plasticizers should be used for a particular application, the permanence of the plasticizer, in addition to miscibility with the PVC, is crucial. Permanence refers to the stability of plasticizer within the blend. More specifically, plasticizers, especially those with low molecular weights, tend to be migratory in that they tend to move to the surface of the blend where they subsequently evaporate and/or may be removed by soapy water, solvents, oils, etc. These problems are minimized by using high molecular weight polymers. Unfortunately, very high molecular weight polymers may present processing and compatibility problems, cause poor low temperature flexibility, and be costly.

Copolymers of ethylene, carbon monoxide and a termonomer(s), such as vinyl acetate, have been used as plasticizers in blends with PVC to produce flexible films, as well as, rigid and semi-rigid materials. These plasticizers are compatible with PVC, lower the $T_g$ and possess adequate permanence. However, while these plasticizers have proved to be effective, they are prepared using pure feeds of the individual monomers which can be costly. Hence, there is still a need to investigate other PVC plasticizers which are compatible with PVC and sufficiently lower the PVC resin's $T_g$. Additionally, less expensive avenues to produce known plasticizers should also be pursued.

SUMMARY OF INVENTION

The instant invention provides novel polyvinyl chloride compositions having CO-containing polymers which act as plasticizers. These CO-containing polymers are low molecular weight copolymers with low crystallinity. Depending on the particular plasticizer(s) used and the type of PVC, percentage mix, etc., advantages of the instant invention include: lower plasticizer volatility and accompanying lower migration; lower cost than conventional monomeric plasticizers; improved processability and compatibility; and effective lowering of the PVC resin glass transition temperature ("$T_g$").

In one embodiment, the invention is a PVC resin composition comprising polyvinyl chloride and a plasticizer selected from the group consisting of: i) a non-linear, paraffin-soluble olefin-CO copolymer; ii) an olefin-CO-X terpolymer derived from non-pure feeds; ii) a non-linear olefin-CO copolymer derived from non-pure feeds; iv) a non-linear CO-X copolymer; and v) mixtures thereof; wherein X is selected from the group consisting of alpha-olefin, vinyl acetate, neo vinyl ester and mixtures thereof. The composition may further comprise further comprising a compound selected from the group consisting of dialkyl phthalate, dialkyl isophthalate, dialkyl terephthalate, trialkyl trimellitate, tetraalkyl pyromellitate, monoalkhyl benzoate, dialkyl azelate, dialkyl sebacate, dialkyl adipate, and mixtures thereof. The composition may also further comprising a stabilizer or filler selected from the group consisting of calcium, barium, cadmium, zinc, lead, calcium carbonate, clay, and mixtures thereof.

In another embodiment, the invention is a product prepared from the PVC resin according as described above wherein said product is selected from the group consisting of a film, a sheet, an extruded item, a molded item a cast item and mixtures thereof.

In yet another embodiment, the invention is a method for a preparing a PVC resin comprising blending polyvinyl chloride with a plasticizer selected from the group consisting of: i) a non-linear, paraffin-soluble olefin-CO copolymer; ii) an olefin-CO-X terpolymer derived from non-pure feeds; iii) a non-linear olefin-CO copolymer derived from non-pure feeds; iv) a non-linear CO-X copolymer; and v) mixtures thereof; wherein X is selected from the group consisting of alpha-olefin, vinyl acetate, neo vinyl ester and mixtures thereof. This method may further comprise the step of blending a further comprising the step of blending a compound selected from the group consisting of dialkyl phthalate, dialkyl isophthalate, dialkyl terephthalate, trialkyl trimellitate, tetra-alkyl pyromellitate, monoalkhyl benzoate, dialkyl azelate, dialkyl sebacate, dialkyl adipate, and mixtures thereof.

These and other features, aspects and advantages of the present invention will become better understood with regard to the following description and appended claims.

DESCRIPTION

The instant invention relates to novel PVC/plasticizer blends and the method of producing such blends based on carbon monoxide ("CO") containing plasticizers which are formed from non-pure feed streams such as synthesis gas ("syngas") and multi-component synthesis gas ("MCS"). Pure co-feeds such as vinyl monomers, including olefins, may also be used in conjunction with non-pure feeds to form the plasticizers. These CO-containing polymers are low molecular weight ("MW") copolymers with low crystallinity. It should be appreciated by those skilled in the art that use of the general term "copolymers" includes terpolymers and other polymers having various combinations of different monomer units. It should also be appreciated that the term "polyvinyl chloride" or "PVC" means homopolymers of vinyl chloride, as well as, copolymers thereof containing up to about 20% of other monomers including, but not limited to, vinyl acetate, propylene, ethylene, butyl vinyl ether, diethyl maleate, dimethyl fumarate, etc. With respect to the terms "non-pure", "syngas" and "MCS" feedstreams, one skilled in the art would recognize these to be feeds other than "pure feeds" which are typically defined as being at or close to 100%. Non-pure feed streams are further described in U.S. Pat. No. 6,049,011 to Kiss et al. and co-pending U.S. patent application Ser. Nos. 09/233,353 and 09/233,362—all of which are herein incorporated by reference.

The plasticizers of this invention may be synthesized using well known free radical polymerization techniques as described in co-pending U.S. patent application Ser. Nos. 09/233,353 and 09/233,362—both of which are herein incorporated by reference. Because the instant invention employs free-radical polymerization to form its non-linear copolymers, the resulting non-linear copolymers may also be characterized as being non-alternating.

The instant invention provides novel polyvinyl chloride compositions having CO-containing polymers which act as plasticizers. These CO-containing polymers are low molecular weight copolymers with low crystallinity. Depending on the particular plasticizer(s) used and the type of PVC, percentage mix, etc., advantages of the instant invention include: lower plasticizer volatility; lower cost than conventional monomeric plasticizers; improved processability and compatibility; and effective lowering of the PVC resin glass transition temperature ("$T_g$").

The composition of the invention is a PVC resin which contains a novel plasticizer. More specifically, the plasticizer is selected from the following:

1) A non-linear, paraffin-soluble olefin-CO copolymer. A more detailed description of these co-polymers can be found in U.S. application Ser. No. 09/233,362 which is herein incorporated by reference.
2) An olefin-CO—X terpolymer derived from non-pure feeds. A more detailed description of these terpolymers can be found in U.S. application Ser. No. 09/233,353 which is herein incorporated by reference. Although this terpolymer is defined as being "derived from non-pure feeds", this terminology is meant to include co-feeds where at least one feed is from a non-pure source and another feed is from a pure source. For example, the non-pure feed could be from syngas or MCS while the co-feed is from a pure source such as vinyl acetate.
3) A non-linear olefin-CO copolymer derived from non-pure feeds. Here again, it should be noted that defining this copolymer as being "derived from non-pure feeds", it is meant to also include co-feeds where at least one feed is from a non-pure source and another feed may be from a pure source. These copolymers may include paraffin-soluble as well as paraffin insoluble varieties. Typical molecular weights will be in the range of about 200 to 30000 and have branches in the order of 20 to 300. In a preferred embodiment, the olefin is ethylene.
4) A non-linear CO—X copolymer where X may be an alpha-olefin, vinyl acetate, neo vinyl ester or mixtures thereof.
5) Mixtures of the plasticizers defined in 1–4.

The non-pure feeds preferably comprise a total olefin amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The non-pure feeds may further comprise acetylene in an amount ranging up to about 10 mole %.

The composition may optionally contain, in addition to the plasticizers defined above, a dialkyl phthalate, or other suitable monomeric esters such as dialkyl isophthalates, dialkyl terephthalates, benzoates, trialkyl trimellitates, and the like. Preferred dialkyl phthalates are those having alkyl groups with approximately 4 to 20 carbons. In a preferred embodiment, the ratio of plasticizer to dialkyl phthalates will be in the range of 9:1 to 1:9 and the mix of these plasticizers will account for about 0.01 to 75 weight percent of the PVC resin composition. Thus, in this preferred embodiment, the polyvinyl chloride will make up approximately 25 to 99.99 weight percent of the PVC resin composition. The composition may also further comprise stabilizers, fillers, and/or other well-known additives that are commonly used in the art. Suitable stabilizers include, but are not limited to, calcium, barium, cadmium, zinc, lead and mixtures thereof. Preferably, the stabilizers will make up approximately 0.01 to 7 weight percent of the PVC resin. Suitable fillers include, but are not limited to, calcium carbonate, clay and mixture thereof. Preferably, fillers will be approximately 0.01 to 6 weight percent of the PVC resin.

The synthesis of the copolymer and terpolymer of the instant invention will advantageously occur at low pressure, free radical polymerization conditions. Such low pressure conditions are at pressures ranging from about 100 psig to about 3,000 psig, and preferably from about 500 psig to 800 psig. Additionally, the polymerization temperatures will typically range from about 50° C. to about 300° C., and preferably from about 50° C. to about 200° C.

In another embodiment, the invention is an article produced from the PVC resin composition described above. For instance, the PVC resin composition could be made into a film or a sheet. Articles can also be extruded, molded or cast from the PVC resin composition.

Also provided for is a method for a preparing a PVC resin comprising blending polyvinyl chloride with a plasticizer, as defined above. The method may further include the step of blending a dialkyl phthalate. Additionally, stabilizers and/or fillers may also be blended. Standard PVC/plasticizer blending techniques, well known to those skilled in the art, may be used such as adding the plasticizers to PVC on hot rolls or in a hot mixture such as a Banbury. Typical temperatures for such blending techniques are in the range of about 20 to 300° C. Preferred temperature ranges are from about 50 to 230° C. Typical pressures for these blending techniques can range widely from about 100 to 60000 psi. Preferred pressure ranges are in the range of about 100 to 30000 psi. Processing aids, such as stearic acid, may optionally be used. Thus, small amounts of these processing aids may, or may not, become incorporated into the composition. Additionally, as illustrated in the examples below, the copolymer and terpolymers can be dissolved in organic solvents along with the PVC and then cast to form a film.

The invention is further described in the following non-limiting examples.

EXAMPLES

Example 1

Synthesis of Ethylene-CO Polymers Using MCS Feed

CO containing polymers using a dilute MCS feed was synthesized according to free-radical polymerization techniques as follows:

A 300 ml autoclave reactor was charged with 150 mL pure n-hexane and 0.6 g of a 75% solution of t-butyl peroxypivalate in mineral spirits. (t-Butyl peroxypivalate has a 10 hour half-life at 55° C. in a 0.2 M benzene solution, Swern, *Organic Peroxides*, John Wiley and Sons, 1970, Vol. 1, pp 82, 87). The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane was removed on a rotary evaporator to obtain the product.

The product was characterized by IR, NMR and GPC. The FTIR spectrum of the product showed a very strong peak at 1715 cm$^{-1}$ due to carbonyl group, indicating incorporation of carbon monoxide in the product. The $^{13}$C NMR of the product indicated that the polymer had 5.1% CO incorporation and a non-linear (branched) polyethylene structure, as indicated by a broad multiplet in the $^{13}$C NMR for the alkyl region at 9–48 ppm and a multiplet at 206–218 for the CO resonance. The GPC of the product indicated a Mn of 320 and a Mw of 420.

Example 2
Synthesis of Ethylene-CO-1-Octene Terpolymers

CO containing polymers using a dilute MCS as co-feed with 1-octene was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 20 g 1-octene was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted octene was removed on a rotary evaporator to obtain the 2.9 g of product.

The product was characterized by IR, NMR and GPC. The FTIR spectrum of the product showed a very strong peak at 1715 cm$^{-1}$ due to carbonyl group, indicating incorporation of carbon monoxide in the product. The GPC of the product indicated a Mn of 860 and a Mw of 1010.

Example 3
Synthesis of Ethylene-CO-Vinyl Acetate Terpolymers

CO containing polymers using a dilute MCS as co-feed with vinyl acetate was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 2 g vinyl acetate was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted octene was removed on a rotary evaporator to obtain the 2.5 g of product.

The product was characterized by IR, NMR and GPC. The $^{13}$C NMR of the product indicated that the polymer had 9 mole % CO, 56 mole % ethylene and 35 mole % vinyl acetate. The GPC of the product indicated a Mn of 730 and a Mw of 1620.

Example 4
Synthesis of Ethylene-CO-Vinyl Neo-10 Ester Terpolymers

CO containing polymers using a dilute MCS as co-feed with neo vinyl ester (Exxar™ Neo-10) was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 5 g neo vinyl ester (Exxar™ Neo-10) was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted neo vinyl ester was removed initially on a rotary evaporator and then on Kugelrohr apparatus to obtain the 1.9 g of product.

The $^{13}$C NMR of the product indicated that the polymer had 4.6 mole % CO, 48 mole % ethylene and 47.4 mole % neo vinyl ester (Exxar™ Neo-10). The GPC of the product indicated a Mn of 1450 and a Mw of 2100.

Example 5
Synthesis of Ethylene-CO-Vinyl Neo-10 Ester Terpolymers

CO containing polymers using a dilute MCS as co-feed with neo vinyl ester (Exxar™ Neo-10) was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 2 g neo vinyl ester (Exxar™ Neo-10) was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole % hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted neo vinyl ester was removed initially on a rotary evaporator and then on Kugelrohr apparatus to obtain the product.

The $^{13}$C NMR of the product indicated that the polymer had 7.9 mole 25% CO, 55.6 mole % ethylene and 36.4 mole % neo vinyl ester (Exxar™ Neo-10). The GPC of the product indicated a Mn of 970 and a Mw of 1300.

Example 6
Synthesis of CO-1-Octene Copolymer

A 300 ml autoclave reactor was charged with 150 mL pure n-hexane and 0.6 g of a 75% solution of t-butyl peroxypivalate in mineral spirits. 10 g 1-octene was added in the reactor. The reactor was sealed and purged with purified nitrogen. The reactor was then pressurized with CO to 700 psig. The temperature was raised to 66° C. while stirring and the pressure was maintained for 24 hours. The reactor was allowed to cool to room temperature and was then depressurized. The hexane and unreacted octene was removed on a rotary evaporator to obtain the 1.38 g of product.

The FTIR spectrum of the product showed a very strong peak at 1711 cm$^{-1}$ due to carbonyl group, indicating incorporation of carbon monoxide in the product. The $^{13}$C NMR of the product indicated that the polymer had 27 mole % CO and 73 mole % 1-octene. The GPC of the product indicated a Mn of 965 and a Mw of 1175.

Example 7
Plasticization Study Using Plasticizers Derived from MCS

In order to demonstrate in a simple manner the effect of plasticization, films of the PVC resin were prepared as follows: 10 g PVC polymer (Aldrich, 233,000) was dissolved in 150 mL THF and the solution was stirred at room temperature for 24 hrs to obtain a stock solution. 2.5 mL of PVC solution was mixed with appropriate concentration of plasticizer (as THF solution) to give plasticizer content from 10 to 50%. The mixer was stirred for 12 hours at room temperature and the resultant solution poured on to horizontal aluminum or glass container. The solvent was allowed to evaporate slowly under nitrogen. After 12 hours the films were peeled away from the container. They were dried in a vacuum over at 50° C. for 12 hours. The flexibility of the films were compared by bending back and forth between the fingers; also their glass transition temperatures ("$T_g$") were evaluated using a differential scanning calorimeter ("DSC").

Relaxation in PVC resin from glassy to the plastic state and effect of various chemical plasticizers was measured calorimetrically using a DSC. The Tg was evaluated from the step change in heat capacity, Cp (value at half $\Delta$Cp is reported), when the sample was heated at a controlled heating rate of 10K/min. All samples analyzed were treated to similar thermal history prior to measurement. The films obtained from the PVC and carbon monoxide containing polymers described above were transparent.

TABLE 1

Effect of plasticizers on the $T_g$ of PVC

| Example Number | Sample Description | PVC $T_g$ (° C.) | Plasticizer Concentration (wt %) | $\Delta T_g$ (° C) |
|---|---|---|---|---|
| | PVC Aldrich (Mw 233,000) | 82 | — | — |
| 1 | ECO (MCS) | — | 10 | 19 |
| 2 | ECO (MCS)/Octene | — | 20 | 20 |
| 3 | ECO (MCS)-VA | — | 20 | 28 |
| 5 | ECO (MCS)-Neo-10 ester | — | 10 | 12 |
| 6 | CO/1-octene | — | 20 | 12 |
| | Phthalate | — | 20 | 40 |

The decrease in the $T_g$ of the PVC with carbon monoxide-containing polymers provides evidence that these compositions are active as PVC plasticizer.

Example 8
The Synthesis of Ethylene-CO Copolymers Using Ethylene and Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 50:25:25, respectively). The temperature was raised to 66° C. while stirring, and the pressure was maintained for 24 hours. The reactor was allowed to cool to room temperature and then depressurized. The hexane was removed on a rotary evaporator, leaving 7.8 g of product.

The IR spectrum of the product shows a very strong peak at 1705 cm$^{-1}$ due to the carbonyl group. Thus, CO has been incorporated in the product. The NMR of the product suggests that the polymer has 39.5% CO incorporation. The GPC of the product indicates a Mn of 1100 and Mw of 2300 (polystyrene standards, THF solvent).

Example 9
Synthesis of Ethylene-CO Copolymers Using Ethylene and Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). The temperature was raised to 66° C. while stirring, and the pressure was maintained for 24 hours. The reactor was allowed to cool to room temperature and then depressurized. The hexane was removed on a rotary evaporator leaving 9.3 g of product.

The IR spectrum of the product shows a very strong peak at 1709 cm$^{-1}$ due to the carbonyl group. Thus, CO has been incorporated in the product. The NMR of the product suggests that the polymer has 33.9% CO incorporation. The GPC of the product indicates a Mn of 1600 and Mw of 3200 (polystyrene standards, THF solvent).

Example 10
Synthesis of Ethylene-CO Copolymers Using Ethylene and Syngas

A 300-mL autoclave engineer's reactor was charged with 150 mL pure n-hexane and 0.64 g of t-butyl peroxide in mineral spirits. The reactor was sealed and purged with purified nitrogen. The reactor was then pressurized with an ethylene and syngas mixture (ethylene:carbon monoxide:hydrogen 70:15:15, respectively). The temperature was raised to 120° C. while stirring, and the pressure was maintained for 24 hours. The reactor was allowed to cool to room temperature and then depressurized. The hexane was removed on a rotary evaporator leaving 4.3 g of product.

The IR spectrum of the product shows a very strong peak at 1711 cm$^{-1}$ due to the carbonyl group. Thus, CO has been incorporated in the product. The NMR of the product suggests that polymer had 19.3% CO incorporation. The GPC of the product indicates a Mn of 590 and Mw of 1100 (polystyrene standards, THF solvent).

Example 11
Plasticization Study Using Ethylene-CO Plasticizers Derived from Syngas To demonstrate in a simple manner the effect of plasticization, films of the polymers were prepared as follows: 10 g PVC polymer (Aldrich, 233,000) were dissolved in 150 mL THF and the solution was stirred at room temperature for 24 hours to obtain a stock solution. Then 2.5 mL of PVC solution were mixed with an appropriate concentration of plasticizer (as THF solution, sometimes hot THF solution) to give plasticizer content from 10 to 50%. The solvent was allowed to evaporate under nitrogen. After 12 hours the films were peeled away from the container. They were dried in a vacuum oven at 50° C. for 12 hours. Film flexibility was compared by bending the films back and forth between the fingers; also, their $T_g$ were evaluated.

Relaxation in PVC from glassy to the plastic state and the effect of various chemical plasticizers were measured calorimetrically using a DSC. The Tg was evaluated from the step change in heat capacity, Cp (value at half $\Delta$Cp is reported), when the sample was heated at a controlled heating rate of 10K/min. All samples analyzed were exposed to a similar thermal history before measurement. The films obtained from the PVC and carbon-monoxide-containing polymers described above were transparent.

Table 2 shows the decrease in the $T_g$ of PVC upon addition of various levels of ethylene-CO copolymers. The commercial plasticizer di-tridecyl phthalate (DTDP) is also plotted as a reference.

TABLE 2

Effect of ethylene-CO plasticizers on the $T_g$ of PVC

| Plasticizer Concentration (wt %) | $T_g$ of PVC + DTDP | $T_g$ of PVC + ECO polymer of Example 8 | $T_g$ of PVC + ECO polymer of Example 9 | $T_g$ of PVC + ECO polymer of Example 10 |
|---|---|---|---|---|
| 0 | 82 | 82 | 82 | 82 |
| 10 | 60 | 63 | 61 | 52 |
| 20 | 43 | 47 | 46 | 34 |
| 30 | 27 | 29 | 33 | 21 |
| 40 | — | — | 27 | 13 |
| 50 | 10 | — | — | 4 |

The decrease in the $T_g$ of the PVC with ethylene/carbon monoxide copolymers provides evidence that these compositions are active as PVC plasticizers.

Example 12
Synthesis of Ethylene-CO-Alpha-Olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with ethylene and syngas mixture (ethylene:carbon monoxide:hydrogen 70:15:15, respectively). Then 10.8 g of 1-butene was added, the temperature was raised to 66° C. while stirring, and the pressure was maintained for 24 hours. The reactor was allowed to cool to room temperature and then depressurized. The hexane was removed on a rotary evaporator, leaving 4.9 g of the product.

The IR spectrum of the product shows a very strong peak at 1711 cm$^{-1}$ due to the carbonyl group. Thus, CO has been incorporated in the product. The NMR of the product suggests that the polymer has 25.8% CO incorporation. The NMR spectrum of the terpolymer suggested that it has 134.9 branches per 1000 carbons versus 65.5 branches per 1000 carbons for a control experiment without 1-butene termonomer. This observation indicates that increased in branching may result from alpha-olefin incorporation in the polymer. The GPC of the product indicates a Mn of 1000 and Mw of 2000 (polystyrene standards, THF solvent).

Example 13
Synthesis of Ethylene-CO-Alpha-Olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of 1-butene was added, the temperature was raised to 66° C. while stirring, and the pressure was maintained for 24 hours. The reactor was allowed to cool to room temperature and then depressurized. The hexane was removed on a rotary evaporator leaving 7.0 g of the product.

The IR spectrum of the product showed a very strong peak at 1711 cm$^{-1}$ due to the carbonyl group. Thus, CO has been incorporated in the product. The NMR of the product suggested that the polymer had 29.6% CO incorporation. The NMR spectrum of the terpolymer suggested that it has 101 branches per 1000 carbons versus 65.5 branches per 1000 carbons obtained in a control experiment without the 1-butene termonomer. This observation indicates that increased branching may result from alpha-olefin incorporation in the polymer. The GPC of the product indicates a Mn of 500 and Mw of 1000 (polystyrene standards, THF solvent).

Example 14
Synthesis of Ethylene-CO-Alpha-Olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of propylene was added, the temperature was raised to 66° C. while stirring, and the pressure was maintained for 24 hours. The reactor was allowed to cool to room temperature and was then depressurized. The hexane was removed on a rotary evaporator, leaving 7.6 g of the product.

The IR spectrum of the product showed a very strong peak at 1711 cm$^{-1}$ due to the carbonyl group. Thus, CO has been incorporated in the product. The NMR of the product suggested that the polymer had 17.5% CO incorporation. The NMR spectrum of the terpolymer suggested that it has 72.8 branches per 1000 carbons versus 65.5 branches per 1000 carbons obtained in a control experiment without the propylene termonomer. This observation indicates that increased branching may result from alpha-olefin incorporation in the polymer. The GPC of the product indicated a Mn of 500 and Mw of 1000 (polystyrene standards, THF solvent).

Example 15
Synthesis of Ethylene-CO-Alpha-Olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas (ethylene:carbon monoxide:hydrogen 70:15:15, respectively) mixture. Then 10.8 g of 2-butene was added, the temperature was raised to 66° C. while stirring, and the pressure was maintained for 24 hours. The reactor was allowed to cool to room temperature and then depressurized. The hexane was removed on a rotary evaporator, leaving 6.7 g of the product.

The IR spectrum of the product showed a very strong peak at 1711 cm$^{-1}$ due to the carbonyl group. Thus, CO has been incorporated in the product. The NMR of the product suggested that the polymer had 18.2% CO incorporation. The NMR spectrum of the terpolymer suggested that it has 93.2 branches per 1000 carbons versus 65.5 branches per 1000 carbons obtained in a control experiment without 2-butene termonomer. This observation indicates that increased branching may result from alpha-olefin incorporation in the polymer. The GPC of the product indicated a Mn of 590 and Mw of 1120 (polystyrene standards, THF solvent).

Example 16
Plasticization Study Using Ethylene-CO-Alpha-Olefin Plasticizers Derived from Syngas To demonstrate in a simple manner the effect of plasticization, films of the polymers were prepared as follows: 10 g PVC polymer (Aldrich, 233,000) were dissolved in 150 mL THF and the solution was stirred at room temperature for 24 hours to obtain a stock solution. Then 2.5 mL of PVC solution was mixed with an appropriate concentration of plasticizer (as THF solution, sometimes hot THF solution) to give a plasticizer content from 10 to 50%. The solvent was allowed to evaporate under nitrogen. After 12 hours the films were peeled away from the container. They were dried in a vacuum oven at 50° C. for 12 hours. Film flexibility was compared by bending the films back and forth between the fingers; also, their $T_g$ were evaluated.

Relaxation in PVC from glassy to the plastic state and the effect of various chemical plasticizers were measured calorimetrically using DSC. The $T_g$ was evaluated from the step change in heat capacity, Cp (value at half $\Delta$Cp is reported), when the sample was heated at a controlled heating rate of 10K/min. All samples analyzed were exposed to a similar thermal history before measurement. The films obtained from the PVC and carbon-monoxide-containing polymers described above were transparent.

Table 3 shows the decrease in the $T_g$ of PVC upon addition of various levels of these terpolymers. The commercial plasticizer, di-tridecyl phthalate (DTDP) is also plotted as a reference.

TABLE 3

Effect of ethylene-CO-alpha-olefin plasticizers on the $T_g$ of PVC

| Plasticizer Concentration (wt %) | $T_g$ of PVC + DTDP | $T_g$ of PVC + terpolymer of Example 12 | $T_g$ of PVC + terpolymer of Example 13 | $T_g$ of PVC + terpolymer of Example 14 | $T_g$ of PVC + terpolymer of Example 15 |
|---|---|---|---|---|---|
| 0 | 82 | 82 | 82 | 82 | 82 |
| 10 | 60 | 55 | 63.66 | 63.25 | 64.16 |
| 20 | 43 | 42 | 50.79 | 48.07 | 51.12 |
| 30 | 27 | 31 | 40.91 | 41.1 | 39.9 |
| 40 | — | 25 |  | 31.7 | 29.7 |
| 50 | 10 | 20 | 28.4 | 24.62 | 23.35 |

The decrease in the $T_g$ of the PVC resin with ethylene/carbon monoxide copolymers provides evidence that these compositions are active as PVC plasticizers.

The foregoing examples clearly demonstrate that the instant invention provides compatible CO-containing plasticizers for use with PVC. More specifically, the PVC resins of the instant invention have decreased $T_g$. Additionally, the compositions produced in the non-limiting examples showed no evidence of phase separation which suggests adequate compatibility. Finally, the instant invention can be synthesized using relatively inexpensive non-pure fees such as syngas and MCS. Hence, the desirable characteristics (e.g., low $T_g$, compatibility and lower cost) discussed in the background section are satisfied by the instant invention.

What is claimed is:

1. A PVC resin composition comprising polyvinyl chloride and a plasticizer selected from the group consisting of: i) a non-linear, paraffin-soluble olefin-CO copolymer; ii) an olefin-CO-X terpolymer derived from non-pure feeds; iii) a non-linear olefin-CO copolymer derived from non-pure feeds; iv) a non-linear CO-X copolymer; and v) mixtures thereof, wherein X is selected from the group consisting of alpha-olefins, vinyl acetate, neo vinyl ester, acrylates, and mixtures thereof, wherein the copolymer and terpolymer are synthesized at low pressure, free radical polymerization conditions and said non-pure feeds comprise at least one olefin, carbon monoxide, carbon dioxide, hydrogen and methane, and further wherein the low pressure comprises a pressure of from about 100 psig to about 3,000 psig.

2. The composition according to claim 1 further comprising a compound selected from the group consisting of dialkyl phthalate, dialkyl isophthalate, dialkyl terephthalate, trialkyl trimellitate, tetraalkyl pyromellitate, monoalkyl benzoate, dialkyl azelate, dialkyl sebacate, dialkyl adipate, and mixtures thereof.

3. The composition according to claim 2 wherein said compound's alkyl groups each have about 4 to 20 carbon atoms.

4. The composition according to claim 2 wherein the weight ratio of said plasticizer to said compound is in the range of about 1:9 to 9:1.

5. The composition according to claim 2 wherein said compound and said plasticizer comprise about 0.01 to 75 wt % of the PVC resin composition.

6. The composition of claim 1 or 2 further comprising a stabilizer selected from the group consisting of calcium, barium, cadmium, zinc, lead, and mixture thereof.

7. The composition of claim 6 further comprising a filler selected from the group consisting of calcium carbonate, clay, and mixture thereof.

8. The composition of claim 1 or 2 further comprising a filler selected from the group consisting of calcium carbonate, clay, and mixture thereof.

9. The composition of claim 1 wherein said polyvinyl chloride comprises from about 25 to 99.99 wt % of the PVC resin and said plasticizer comprises from about 0.01 to 75 wt % of the PVC resin.

10. An article formed from the PVC resin composition according to claim 1.

11. A method for a preparing a PVC resin comprising:
blending polyvinyl chloride with a plasticizer selected from the group consisting of: i) a non-linear, paraffin-soluble olefin-CO copolymer; ii) an olefin-CO-X terpolymer derived from non-pure feeds; iii) a non-linear olefin-CO copolymer derived from non-pure feeds; iv) a non-linear CO-X copolymer; and v) mixtures thereof, wherein X is selected from the group consisting of alpha-olefin, vinyl acetate, neo vinyl ester and mixtures thereof, wherein the copolymer and terpolymer are synthesized at low pressure, free radical polymerization conditions and said non-pure feeds comprise at least one olefin, carbon monoxide, carbon dioxide, hydrogen and methane, and further wherein the low pressure comprises a pressure of from about 100 psig to about 3,000 psig.

12. The method according to claim 11 further comprising the step of blending a compound selected from the group consisting of dialkyl phthalate, dialkyl isophthalate, dialkyl terephthalate, trialkyl trimellitate, tetraalkyl pyromellitate, monoalkyl benzoate, dialkyl azelate, dialkyl sebacate, dialkyl adipate, and mixtures thereof.

13. The method of claim 11 or 12 further comprising the step of blending a stabilizer selected from the group consisting of calcium, barium, cadmium, zinc, lead, and mixture thereof.

14. The method of claim 11 or 12 further comprising the step of blending a filler selected from the group consisting of calcium carbonate, clay, and mixture thereof.

15. The method of claim 13 further comprising the step of blending a filler selected from the group consisting of calcium carbonate, clay, and mixture thereof.

16. The method according to claim 11 wherein said plasticizer is a non-linear, paraffin-soluble olefin carbon monoxide copolymer.

17. The method according to claim 11 wherein said plasticizer further comprises an acetylenically unsaturated monomer unit.

18. The product formed by the method of claim 11.

19. The product formed by the method of claim 12.

20. The method according to claim 11 further comprising forming an article from the PVC resin.

21. The PVC resin composition of claim 1 wherein said non-pure feeds comprise a total olefin amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %.

22. The PVC resin composition of claim 21 wherein said non-pure feeds further comprise acetylene in an amount ranging up to about 10 mole %.

23. The method of claim 11 wherein said non-pure feeds comprise a total olefin amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %.

24. The method of claim 23 wherein said non-pure feeds further comprise acetylene in an amount ranging up to about 10 mole %.

* * * * *